(12) United States Patent
Saiki

(10) Patent No.: US 9,864,904 B2
(45) Date of Patent: Jan. 9, 2018

(54) MOTION ANALYSIS DEVICE AND MOTION ANALYSIS SYSTEM

(71) Applicant: SEIKO EPSON CORPORATION, Tokyo (JP)

(72) Inventor: Kenji Saiki, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 417 days.

(21) Appl. No.: 14/620,891

(22) Filed: Feb. 12, 2015

(65) Prior Publication Data

US 2015/0238813 A1 Aug. 27, 2015

(30) Foreign Application Priority Data

Feb. 21, 2014 (JP) .................. 2014-031825

(51) Int. Cl.
| | |
|---|---|
| *G06K 9/00* | (2006.01) |
| *G01P 15/18* | (2013.01) |
| *G01P 15/14* | (2013.01) |
| *G01P 15/02* | (2013.01) |
| *A63B 24/00* | (2006.01) |
| *G01P 15/00* | (2006.01) |

(52) U.S. Cl.
CPC ...... *G06K 9/00342* (2013.01); *A63B 24/0003* (2013.01); *G01P 15/02* (2013.01); *G01P 15/14* (2013.01); *G01P 15/18* (2013.01); *G01P 15/00* (2013.01)

(58) Field of Classification Search
CPC ..... A63B 24/0003; G01P 15/02; G01P 15/14; G01P 15/18; G06K 9/00342
See application file for complete search history.

(56) References Cited

U.S. PATENT DOCUMENTS

| | | | |
|---|---|---|---|
| 7,602,301 B1 * | 10/2009 | Stirling ............... | A61B 5/1124 340/573.1 |
| 8,384,665 B1 * | 2/2013 | Powers, III ............ | A63F 13/06 345/156 |
| 8,784,228 B2 | 7/2014 | Morin et al. | |
| 8,821,306 B2 | 9/2014 | Margoles et al. | |
| 8,845,451 B2 | 9/2014 | Margoles et al. | |
| 2003/0163287 A1 * | 8/2003 | Vock ................... | A43B 3/0005 702/187 |

(Continued)

FOREIGN PATENT DOCUMENTS

| | | |
|---|---|---|
| JP | 2011242323 A | 12/2011 |
| JP | 2014097381 A | 5/2014 |

*Primary Examiner* — Joseph C Nicely
(74) *Attorney, Agent, or Firm* — Oliff PLC

(57) ABSTRACT

An motion analysis device includes a processing unit that performs motion analysis of a subject using an output of a sensor unit. The sensor unit includes an angular velocity sensor capable of measuring angular velocity of at least 2500 dps, a second acceleration sensor capable of measuring acceleration of at least 50 G, and a first acceleration sensor capable of measuring acceleration of at least 24 G. The sensor unit is mounted on at least one of a golf club and a subject. The processing unit calculates a posture of the sensor unit at the time of motion using the angular velocity measured by the angular velocity sensor, and performs selection of outputs of the second and first acceleration sensors according to acceleration applied at the time of the motion and calculates a position of the sensor unit during the motion using the selected acceleration of the sensor.

6 Claims, 13 Drawing Sheets

(56) References Cited

U.S. PATENT DOCUMENTS

| | | | |
|---|---|---|---|
| 2006/0143645 A1* | 6/2006 | Vock | A43B 3/00 725/9 |
| 2009/0247312 A1* | 10/2009 | Sato | A63B 69/3632 473/223 |
| 2010/0141443 A1* | 6/2010 | Romero | G01S 13/04 340/551 |
| 2011/0053698 A1* | 3/2011 | Stites | A63B 69/36 473/223 |
| 2012/0046907 A1* | 2/2012 | Scott | A63B 24/0003 702/151 |
| 2012/0316005 A1* | 12/2012 | Shibuya | G09B 19/003 473/212 |
| 2013/0173212 A1* | 7/2013 | Saiki | G01P 13/00 702/150 |
| 2013/0203518 A1* | 8/2013 | Hatton | A63B 53/047 473/223 |
| 2013/0260909 A1 | 10/2013 | Margoles et al. | |
| 2013/0332105 A1* | 12/2013 | McKown | G01P 21/00 702/141 |
| 2013/0344973 A1 | 12/2013 | Margoles et al. | |
| 2014/0156214 A1* | 6/2014 | Nomura | G01P 3/00 702/141 |
| 2014/0200094 A1* | 7/2014 | Parke | A63F 13/00 473/223 |
| 2014/0214345 A1* | 7/2014 | Ordanis | G01R 19/2513 702/62 |
| 2014/0216180 A1* | 8/2014 | Ueda | G06K 9/0053 73/865.4 |
| 2014/0349776 A1 | 11/2014 | Margoles et al. | |
| 2014/0379294 A1* | 12/2014 | Shibuya | G01P 7/00 702/141 |
| 2015/0042481 A1* | 2/2015 | Nomura | A63B 69/3632 340/669 |
| 2015/0057111 A1* | 2/2015 | Tremblay-Munger | A63B 69/0026 473/446 |
| 2015/0343293 A1* | 12/2015 | Koo | G01P 15/18 702/141 |
| 2016/0047675 A1* | 2/2016 | Tanenhaus | G01C 21/16 702/104 |

* cited by examiner

| MOUNTED SENSOR | GYRO (TRIAXIAL) : 3000dps<br>ACCELERATION (TRIAXIAL) : 16G<br>ACCELERATION (BIAXIAL) : 200G |
|---|---|
| SIZE (W × L × H) | 25mm × 50mm × 15mm |
| WEIGHT | 17g<br>INCLUDING ATTACHMENT |
| BATTERY DURATION TIME | 4hr |
| DATA RATE | 1000sps max |

MOTION ANALYSIS DEVICE AND MOTION ANALYSIS SYSTEM

BACKGROUND

1. Technical Field

The present invention relates to an motion analysis device and an motion analysis system.

2. Related Art

In sports such as golf, tennis, and baseball, motion performance is considered to be improved by reforming rhythms or styles of swing motions. In recent years, motion analysis devices analyzing and suggesting motions for subjects using output data of sensors mounted on motion equipment have been put to practical use. For example, in swing analysis devices that analyze golf swings of subjects, large acceleration or angular velocity is added near impact sites at which the speed of golf clubs is the maximum during the swings. Therefore, when such inertia amounts may not be comprehended by sensors, exact swing analysis may not be performed. Accordingly, JP-A-2011-242323 proposes a device that analyzes low-speed swings to high-speed swings by switching between a low-dynamic range sensor and a high-dynamic range sensor.

In JP-A-2011-242323, however, the specification of an acceleration sensor is described, but the specification of a gyro sensor necessary for motion analysis is not described. The specifications of gyro sensors necessary for highly accurate motion analysis have not been sufficiently examined so far.

SUMMARY

An advantage of some aspects of the invention is that it provides an motion analysis device and an motion analysis system capable of performing motion analysis with high accuracy.

The invention can be implemented as the following forms or application examples.

Application Example 1

This application example is directed to an motion analysis device including: a first sensor that is able to measure angular velocity of at least 2500 dps; a second sensor that is able to measure acceleration of at least 50 G; a third sensor that is able to measure acceleration of at least 24 G; and a processing unit that performs motion analysis for a subject using an output of a sensor unit mounted on at least one of motion equipment and the subject operating the motion equipment. The processing unit calculates a posture of the sensor unit at a time of motion using the angular velocity measured by the first sensor, and performs selection of outputs of the second and third sensors according to acceleration applied at the time of the motion and calculates a position of the sensor unit during the motion using the selected acceleration of the sensor.

The motion equipment is equipment used for hitting of a golf club, a tennis racket, a baseball bat, a hockey stick, or the like.

The sensor unit may be, for example, an inertial measurement unit (IMU) capable of measuring acceleration or angular velocity. The sensor unit may be detachably mounted on motion equipment or a body part of a subject or may be fixed to motion equipment, for example, included inside motion equipment, so that the sensor unit is not detachable.

According to the motion analysis device of this application example, the first sensor can comprehend the maximum angular velocity applied during the motion of a general subject and calculate the posture of the sensor unit during the motion with high accuracy. By selecting the outputs of the second and third sensors according to the magnitude of the acceleration applied at the time of the motion, it is possible to comprehend the maximum acceleration from low acceleration applied during the motion of the general subject and to calculate the position of the sensor unit during the motion with high accuracy. For example, a swing trajectory can be output using the calculated posture or position, and thus the subject can evaluate his or her swing objectively.

Application Example 2

In the motion analysis device according to the application example described above, the first sensor may be able to measure angular velocity of rotation of a plurality of axes, and the processing unit may calculate a timing of ball hitting from a norm of the angular velocity generated at the rotation of each axis.

According to the motion analysis device of this application example, the timing of an impact can be detected with high accuracy, and thus the subject can evaluate the pros and cons of his or her swing.

Application Example 3

In the motion analysis device according to the application example described above, the processing unit may perform calculation using the acceleration measured by the third sensor at a time of start of the motion and perform calculation using the acceleration measured by the second sensor when acceleration applied during the motion exceeds a threshold value set in advance.

According to the motion analysis device of this application example, by setting the threshold value of the acceleration in advance, for example, the third sensor with a low measurement range from the time of swing start up to just before the impact can measure the acceleration and the second sensor with a high measurement range before the impact and after the impact can measure the acceleration. Thus, it is possible to calculate the position of the sensor unit at the time of the swing with high accuracy.

Application Example 4

In the motion analysis device according to the application example described above, the first sensor may be able to measure angular velocity of at least 3000 dps.

According to the motion analysis device of this application example, the first sensor can comprehend the maximum angular velocity applied during the motion of an advanced subject. Accordingly, a greater number of motions of the subject can be analyzed with high accuracy using the angular velocity measured by the first sensor.

Application Example 5

In the motion analysis device according to the application example described above, a sampling rate of at least one of the first, second, and third sensors may be equal to or greater than 1 ksps.

According to the motion analysis device of this application example, at least one of the first, second, and third sensors performs the measurement at a short period of 1 ms. Therefore, it is possible to comprehend the motion of the subject with high accuracy.

Application Example 6

In the motion analysis device according to the application example described above, the motion equipment may be a golf club.

According to the motion analysis device of this application example, the analysis of a golf swing can be performed with high accuracy.

Application Example 7

This application example is directed to an motion analysis system including any of the motion analysis device described above and the sensor unit.

According to the motion analysis system of this application example, the motion analysis device can analyze the motion of the subject with high accuracy using the measurement data of the sensor unit.

Application Example 8

In the motion analysis system according to the application example described above, a width of the sensor unit may be equal to or less than a maximum width of a shaft of the motion equipment.

The shaft is a portion of the grip of the motion equipment and a grip portion is also included in the shaft in motion equipment including the grip portion.

According to the motion analysis system of this application example, the sensor unit is smaller in size than the motion equipment. Therefore, there is little concern that the motion of the subject will be hindered.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described in detail with reference to the drawings. The embodiments to be described below do not unjustly limit the contents of the invention described in the appended claims. All of the constituents to be described below may not be said to be requisite constituents of the invention.

Hereinafter, an motion analysis system (motion analysis device) that analyzes golf swings will be described as an example.

1. Motion Analysis System 1-1. First Embodiment

Overview of Motion Analysis System

Figure 1:
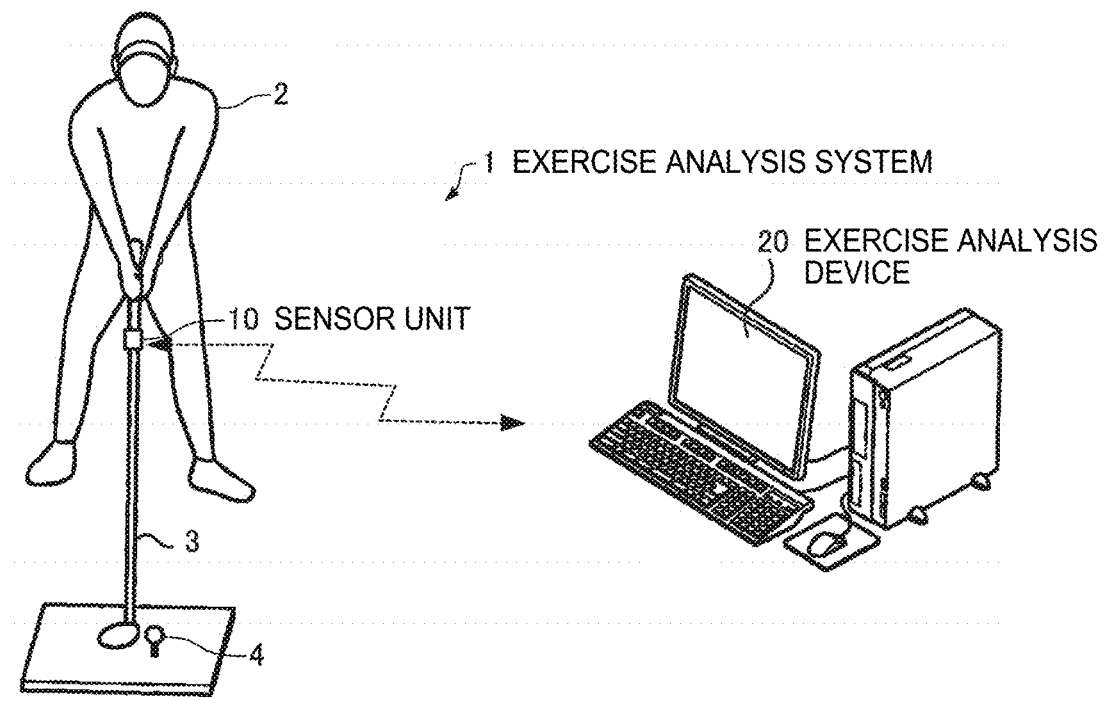
FIG. 1 is a diagram for describing an overview of an motion analysis system.

FIG. 1 is a diagram for describing an overview of an motion analysis system according to the embodiment. An motion analysis system 1 according to the embodiment is configured to include a sensor unit 10 and an motion analysis device 20.

Figure 2A:
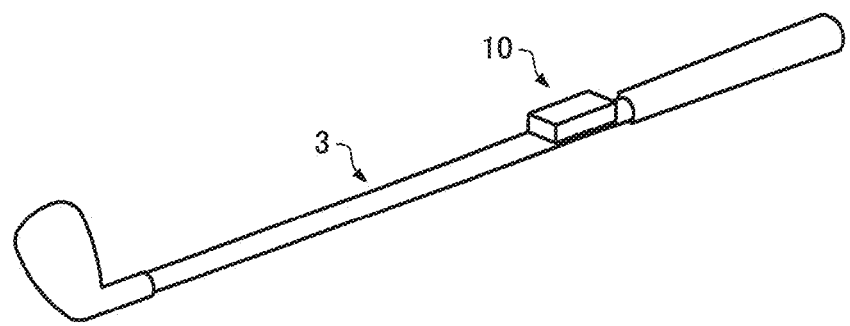
FIGS. 2A to 2C are diagrams illustrating examples of positions at which a sensor unit is mounted.
Figure 2B:
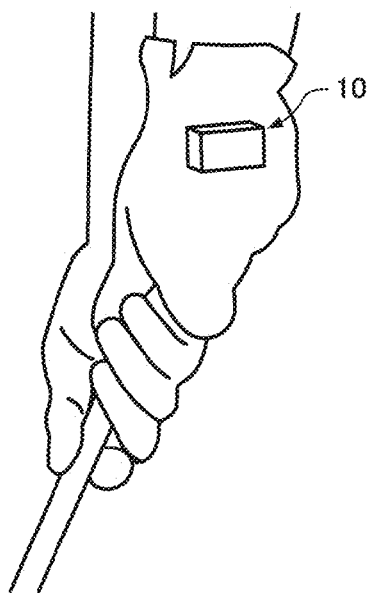
Figure 2C:
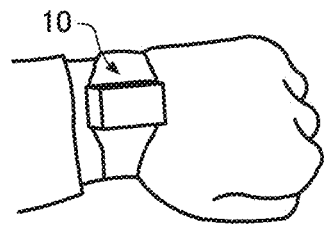

The sensor unit 10 can measure acceleration generated in each axial direction of three axes and angular velocity generated at each axis rotation of the three axes and is mounted on a golf club 3 (which is an example of motion equipment) or a subject 2. For example, as illustrated in FIG. 2A, the sensor unit 10 is mounted on a part of a shaft of the golf club 3. The sensor unit 10 is preferably mounted at a position close to a grip portion in which it is difficult to transfer an impact at the time of ball hitting and a centrifugal force is not applied at the time of swinging. The shaft is a portion of a grip excluding a head of the golf club 3 and also includes the grip portion. For example, as illustrated in FIG. 2B, the sensor unit 10 may be mounted on a hand, a glove, or the like of the subject. For example, as illustrated in FIG. 2C, the sensor unit 10 may be mounted on an accessory such as a wristwatch.

Figure 3:
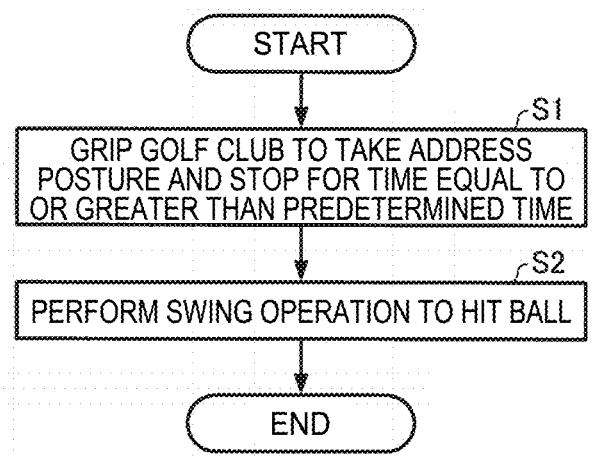
FIG. 3 is a diagram illustrating an order of an action performed by a subject.

The subject 2 performs a swing action of hitting a golf ball 4 in an order determined in advance. FIG. 3 is a diagram illustrating an order of the action performed by the subject 2. As illustrated in FIG. 3, the subject 2 first grips the golf club 3 to take an address posture and stops for a time equal to or greater than a predetermined time (for example, 1 second or more) (S1). Next, the subject 2 performs a swing action to hit the golf ball 4 (S2).

While the subject 2 performs the action of hitting the golf ball 4 in the order illustrated in FIG. 3, the sensor unit 10 measures triaxial acceleration and tri-angular velocity for a predetermined period (for example, 1 ms) and sequentially transmits measured data to the motion analysis device 20. The sensor unit 10 may transmit the measured data immediately or may store the measured data in an internal memory in order to transmit the measured data at a desired timing such as a timing after the end of the swing action of the subject 2. Alternatively, the sensor unit 10 may store the measured data on a detachably mounted recording medium such as a memory card and the motion analysis device 20 may read the measured data from the recording medium.

The motion analysis device 20 analyzes motion performed by the subject 2, generates motion analysis information (swing information) using the data measured by the sensor unit 10, and stores the motion analysis information in a storage unit. The motion analysis device 20 displays the motion analysis information on a display unit automatically or when a predetermined input operation is performed.

Communication between the sensor unit 10 and the motion analysis device 20 may be wireless communication or wired communication.

Configuration of Motion Analysis System

Figure 4:
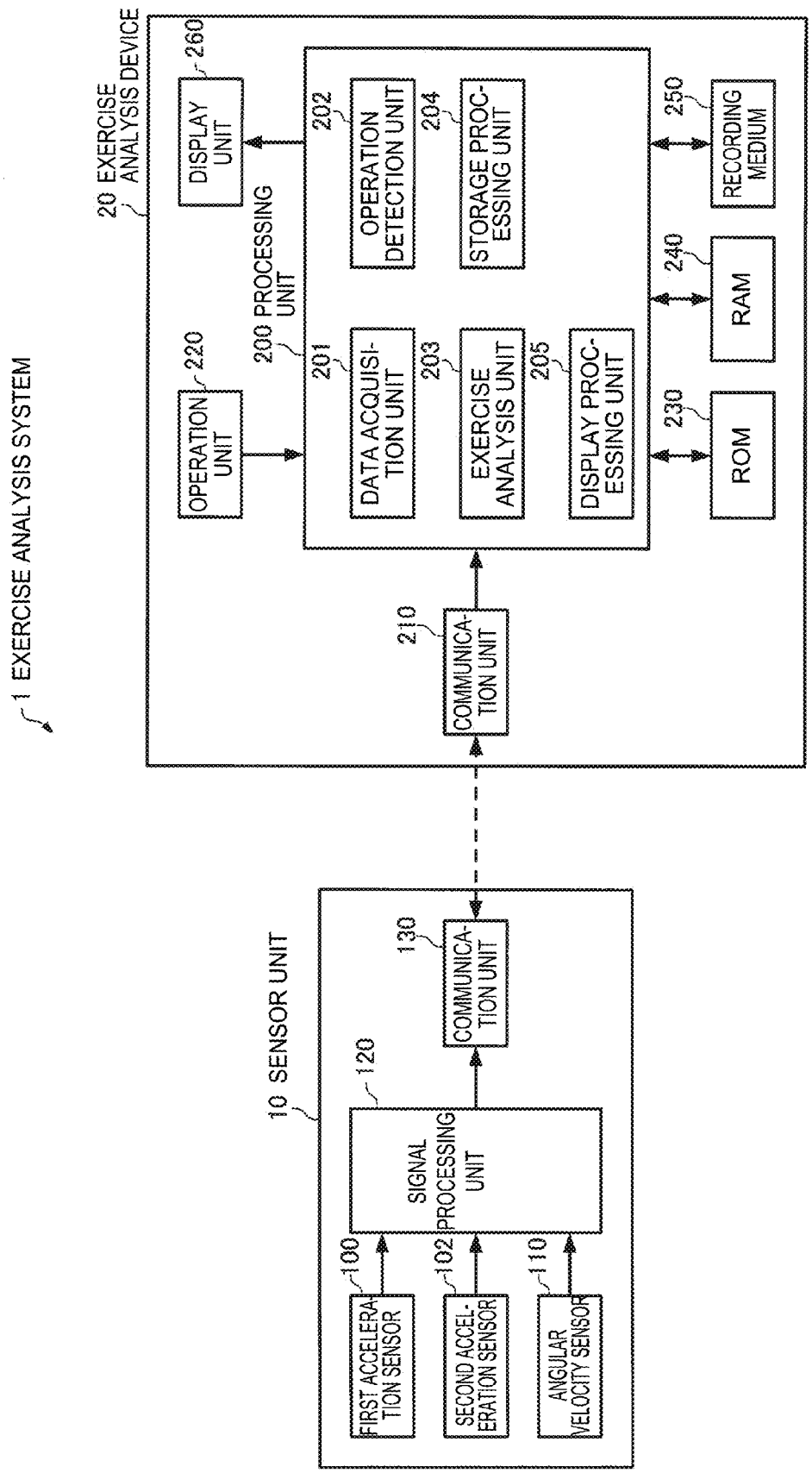
FIG. 4 is a diagram illustrating an example of the configuration of the motion analysis system.

FIG. 4 is a diagram illustrating examples of the configurations of the sensor unit 10 and the motion analysis device 20. In the embodiment, as illustrated in FIG. 4, the sensor unit 10 is configured to include a first acceleration sensor 100, a second acceleration sensor 102, an angular velocity sensor 110, a signal processing unit 120, and a communication unit 130.

The first acceleration sensor 100 (which is an example of a third sensor) measures acceleration generated in each of three-axis directions which intersect each other (which are ideally orthogonal to each other) and outputs digital signals (first acceleration data) according to the magnitudes and directions of the measured three-axis acceleration.

The second acceleration sensor 102 (which is an example of a second sensor) measures acceleration generated in each of the three-axis directions that intersect each other (that are ideally orthogonal to each other) and outputs digital signals (second acceleration data) according to the magnitudes and directions of the measured three-axis acceleration.

In order to perform swing analysis with high accuracy, an acceleration sensor with a low measurement range and a high resolution may be used. However, since translational acceleration applied to the sensor unit 10 becomes almost maximized and acceleration due to an impact of ball hitting is added at the time of ball hitting of swing (at the time of an impact), an output of the acceleration sensor may be saturated. Accordingly, in the embodiment, a low measurement range is set in the first acceleration sensor 100 in order to measure acceleration with a high resolution during a period excluding periods before and after an impact and a high measurement range is set in the second acceleration sensor 102 so that acceleration during the periods before and after the impact can be comprehended. Further, since translation acceleration in a swing direction and centrifugal acceleration in a major axis direction of the shaft of the golf club 3 are large at the time of an impact, the second acceleration sensor 102 may be able to measure acceleration in two-axis direction on the assumption that two axes (for example, the x axis and the y axis) of the sensor unit 10 are mounted to align with the two directions.

The angular velocity sensor 110 (which is an example of a first sensor) measures acceleration generated at each axis rotation of the three axes which intersect with each other (which are ideally orthogonal to each other) and outputs digital signals (angular velocity data) according to the magnitudes and directions of the measured three-axis angular velocity.

The signal processing unit 120 receives the first acceleration data, the second acceleration data, and the angular velocity data from the first acceleration sensor 100, the second acceleration sensor 102, and the angular velocity sensor 110, respectively, stores the first acceleration data, the second acceleration data, and the angular velocity data in a storage unit (not illustrated) in association with time information, associates the stored measurement data (the first acceleration data, the second acceleration data, and the angular velocity data) with the time information, generates packet data conforming with a format for communication, and outputs the packet data to the communication unit 130.

It is ideal to mount the first acceleration sensor 100, the second acceleration sensor 102, and the angular velocity sensor 110 on the sensor unit 10 so that the three respective axes match three axes (x, y, and z axes) of the orthogonal coordinate system (sensor coordinate system) defined for the sensor unit 10, but mounting angle errors occur in practice. Accordingly, the signal processing unit 120 performs a process of transforming the first acceleration data, the second acceleration data, and the angular velocity data into data of the xyz coordinate system using correction parameters calculated in advance according to the respective mounting angle errors.

The signal processing unit 120 performs a temperature correction process for the first acceleration sensor 100, the second acceleration sensor 102, and the angular velocity sensor 110. A temperature correction function may be embedded into the first acceleration sensor 100, the second acceleration sensor 102, and the angular velocity sensor 110.

The first acceleration sensor 100, the second acceleration sensor 102, and the angular velocity sensor 110 may output analog signals. In this case, the signal processing unit 120 may perform A/D conversion on each of the output signals of the first acceleration sensor 100, the second acceleration sensor 102, and the angular velocity sensor 110 to generate measurement data (the first acceleration data, the second acceleration data, and the angular velocity data) and generate packet data for communication using the measurement data.

The communication unit 130 performs, for example, a process of transmitting the packet data received from the signal processing unit 120 to the motion analysis device 20 or a process of receiving a control command from the motion analysis device 20 and transmitting the control command to the signal processing unit 120. The signal processing unit 120 performs various processes according to the control command.

The motion analysis device 20 is configured to include a processing unit 200, a communication unit 210, an operation unit 220, a ROM 230, a RAM 240, a recording medium 250, and a display unit 260 and may be, for example, a personal computer (PC) or a portable device such as a smartphone.

The communication unit 210 performs, for example, a process of receiving the packet data transmitted from the sensor unit 10 and transmitting the packet data to the processing unit 200 and a process of transmitting a control command from the processing unit 200 to the sensor unit 10.

The operation unit 220 performs a process of acquiring operation data from a user and transmitting the operation data to the processing unit 200. The operation unit 220 may be, for example, a touch panel type display, a button, a key, or a microphone.

The ROM 230 stores a program necessary for the processing unit 200 to perform various calculation processes or control processes and stores various programs and data necessary to realize application functions.

The RAM 240 is a storage unit that temporarily stores a program and data used as a working region of the processing unit 200 and read from the ROM 230, data input from the operation unit 220, and calculation results or the like obtained when the processing unit 200 performs calculations according to various programs.

The recording medium 250 is a non-volatile storage unit that stores data necessarily stored for a long time among the data generated by the processing unit 200. The recording medium 250 may store a program necessary when the processing unit 200 performs various calculation processes or control processes or stores various programs and data necessary to realize application functions.

The display unit 260 displays a processed result of the processing unit 200 as text, a graph, a table, an animation, or other images. The display unit 260 may be, for example, a CRT, an LCD, a touch panel type display, or a head-mounted display (HMD). The functions of the operation unit 220 and the display unit 260 may be realized in one touch panel type display.

The processing unit 200 performs a process of transmitting a control command to the sensor unit 10 according to a program stored in the ROM 230 or the recording medium 250 or a program received from a server via a network and stored in the RAM 240 or the recording medium 250, various calculation processes on the data received from the sensor unit 10 through the communication unit 210, and various other control processes. In particular, in the embodiment, the processing unit 200 executes the program to function as a data acquisition unit 201, an action detection unit 202, an motion analysis unit 203, a storage processing unit 204, and a display processing unit 205.

The data acquisition unit 201 performs a process of receiving the packet data received from the sensor unit 10 through the communication unit 210, acquiring the time information and the measurement data (the first acceleration data, the second acceleration data, and the angular velocity data) of the sensor unit 10 from the received packet data, and transmitting the time information and the measurement data to the storage processing unit 204.

The storage processing unit 204 performs a process of receiving the time information and the measurement data from the data acquisition unit 201 and storing the time information and the measurement data in association therewith in the RAM 240.

Based on the time information and the measurement data stored in the RAM 240, the action detection unit 202 performs a process of detecting an action in swing motion in which the subject 2 hits a ball using the golf club 3. Specifically, the action detection unit 202 detects the stop action (the action of step S1 in FIG. 3) performed before start of the swing action by the subject 2 in association with a time. The action detection unit 202 detects a timing (time) at which the subject 2 hits the ball during the swing action (the action of step S2 in FIG. 3).

The motion analysis unit 203 performs a process of calculating an offset amount using the measurement data at the time of the stop action detected by the action detection unit 202, performing bias correction by subtracting the offset amount from the measurement data, and calculating the position and the posture of the sensor unit 10 using the measurement data subjected to the bias correction. For example, the motion analysis unit 203 defines an XYZ coordinate system (world coordinate system) in which the y axis of the sensor coordinate system of the sensor unit 10 is the Y axis, the axis perpendicular to the Y axis on a horizontal plane is the X axis, and the perpendicular upper direction (an opposite direction to the gravity direction) is the Z axis and calculates the position and the posture of the sensor unit 10 in the XYZ coordinate system. The position and the posture of the sensor unit 10 at the time of address (at the time of the stop action) of the subject 2 may be assumed to be an initial position and an initial posture, respectively. For example, the motion analysis unit 203 can calculate the initial posture of the sensor unit 10 from the first acceleration data and the direction of the gravitational acceleration at the time of the address (at the time of the stop action) of the subject 2 by setting the initial position of the sensor unit 10 as the origin (0, 0, 0) of the XYZ coordinate system. The posture of the sensor unit 10 can be expressed by, for example, the rotation angles of the X axis, Y axis, and Z axis rotation (a roll angle, a pitch angle, and a yaw angle), Eulerian angles, or quaternions.

The motion analysis unit 203 defines an motion analysis model (double pendulum model or the like) that considers characteristics (the length of the shaft, the position of the center of gravity, and the like) of the golf club 3 or characteristics (the lengths of arms, the position of the center of gravity, directions in which joints are bent, and the like) of a human body and calculates a trajectory of the motion analysis model using information on the position and the posture of the sensor unit 10. Then, the motion analysis unit 203 analyzes the motion when the subject 2 hits the ball using the golf club 3 based on trajectory information of the motion analysis model and the information detected by the action detection unit 202 to generate motion analysis information (swing information). The motion analysis information is, for example, the trajectory (the trajectory of the head of the golf club 3) of the swing, the rhythm of the swing from backswing to follow-through, a head speed, an incident angle or a face angle (club pass) at the time of the ball hitting, shaft rotation (a change amount of the face angle during the swing), a V zone, information on a deceleration rate of the golf club 3, or information on a variation of each piece of information when the subject 2 swings a plurality of times.

In particular, in the embodiment, the action detection unit 202 and the motion analysis unit 203 select one of the first acceleration data and the second acceleration data according to the magnitude of the acceleration applied to the sensor unit 10 and uses the data as the acceleration data used to perform each of the above-described processes.

The signal processing unit 120 of the sensor unit 10 may calculate the offset amount of the measurement data to perform the bias correction of the measurement data or the bias correction function may be embedded into the first acceleration sensor 100, the second acceleration sensor 102, and the angular velocity sensor 110. In this case, the bias correction of the measurement data through the motion analysis unit 203 is not necessary.

The storage processing unit 204 performs a process of storing the motion analysis information generated by the motion analysis unit 203 in the RAM 240 or storing the motion analysis information in the recording medium 250 when the motion analysis information is desired to remain as a record.

The display processing unit 205 performs a process of reading the motion analysis information stored in the RAM 240 or the recording medium 250 automatically or when a predetermined input operation is performed, after the swing motion of the subject 2 ends, and causes the display unit 260 to display the read motion analysis information.

Motion Analysis Process

Figure 5:
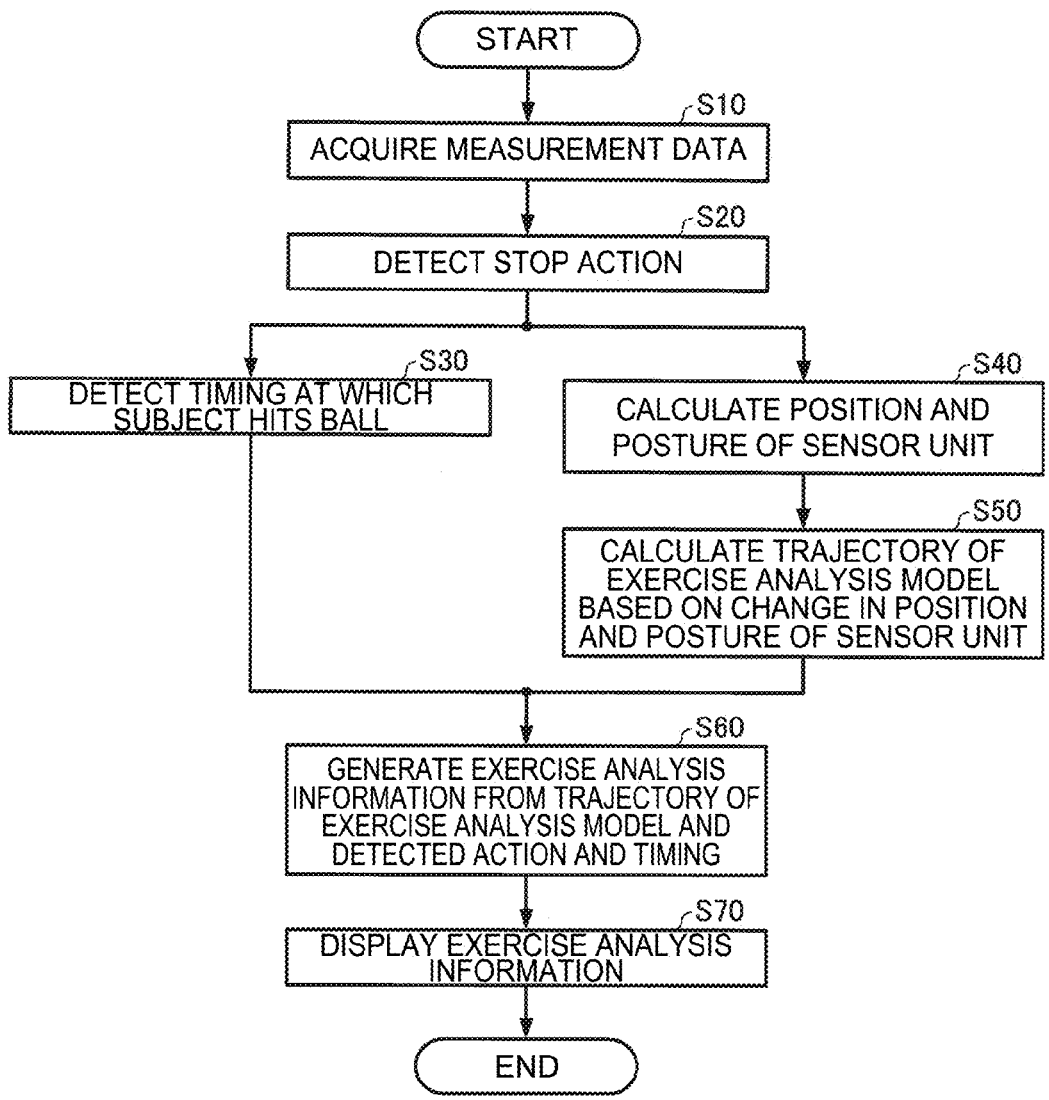
FIG. 5 is a flowchart illustrating an example of an order of an motion analysis process.

FIG. 5 is a flowchart illustrating an example of the order of the motion analysis process performed by the processing unit 200 according to the embodiment.

As illustrated in FIG. 5, the processing unit 200 first acquires the measurement data of the sensor unit 10 (S10). When the processing unit 200 acquires the first measurement data in the swing motion (also including the stop action) of the subject 2 in step S10, the processing unit 200 may perform processes subsequent to step S20 in real time or may perform the processes subsequent to step S20 after processing unit 200 acquires some or all of the series of measurement data in the swing motion of the subject 2 from the sensor unit 10.

Next, the processing unit 200 detects the stop action (the action of step S1 in FIG. 3) of the subject 2 based on the acquired measurement data (S20). When the processing unit 200 performs the process in real time and detects the stop action, the processing unit 200 notifies the subject 2 that the stop action is detected, for example, by outputting a predetermined image or audio or providing an LED with the sensor unit 10 and lighting the LED, so that the subject 2 starts the swing after the subject 2 confirms this notification.

Next, the processing unit 200 performs a process (S30) of detecting the timing at which the subject 2 hits the ball based on the acquired measurement data.

The processing unit 200 performs a process (S40) of calculating the position and the posture of the sensor unit 10 and a process (S50) of calculating the trajectory of the motion analysis model from a change in the position and the posture of the sensor unit 10 in conjunction with the process of step S30. In step S40, the processing unit 200 sets the initial position of the sensor unit 10 as the origin of the XYZ coordinate system, calculates the initial posture of the sensor unit 10 in the XYZ coordinate system using the measurement data at the time of the stop action detected in step S20, and calculates the position and the posture of the sensor unit 10 in association with a time based on the subsequent measurement data.

Next, the processing unit 200 generates and stores the motion analysis information of the swing motion performed by the subject 2 based on the trajectory of the motion analysis model calculated in step S50 and the action and the timing detected in steps S20 and S30 (S60).

Finally, the processing unit 200 displays the motion analysis information (S70).

In the flowchart of FIG. 5, the order of the steps may be appropriately changed within a possible range.

Figure 6:
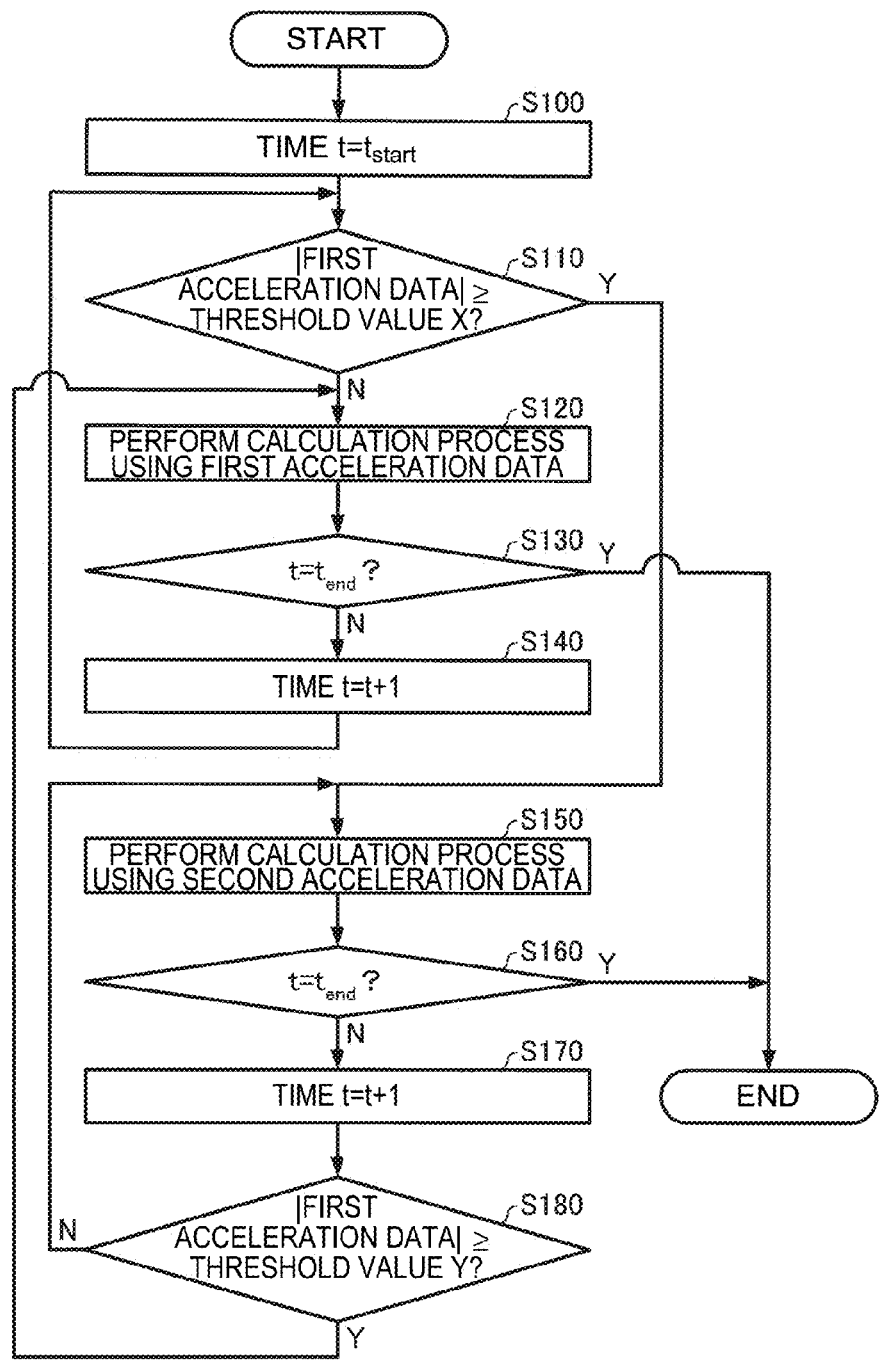
FIG. 6 is a flowchart illustrating an example of a transformation order of acceleration data.

FIG. 6 is a flowchart illustrating an example of a transformation order of the acceleration data used during the calculation process such as the process (step S20 in FIG. 5) of detecting the timing of the ball hitting or the processes (steps S40 and S50 in FIG. 5) of calculating the position and the posture of the sensor unit.

As illustrated in FIG. 6, the processing unit 200 sets a time t to $t_{start}$ (S100). Here, $t_{start}$ is a time of the first measurement data of a calculation target.

Next, when the absolute value of the first acceleration data at the time t is less than a threshold value X at the time t (N in S110), the processing unit 200 performs a calculation process using the first acceleration data (S120). Then, when the time t is $t_{end}$ (Y in S130), the processing unit 200 ends the calculation process. When the time t is not $t_{end}$ (N in S130), the time t increases by 1 (S140) and the processes subsequent to step S110 are performed again. Here, $t_{start}$ is a time of the final measurement data of the calculation target.

Conversely, when the absolute value of the first acceleration data at the time t is equal to or greater than a threshold value X at the time t (Y in S110), the processing unit 200 performs a calculation process using the second acceleration data (S150). Then, when the time t is $t_{end}$ (Y in S160), the processing unit 200 ends the calculation process. When the time t is not $t_{end}$ (N in S160), the time t increases by 1 (S170). When the absolute value of the second acceleration data is greater than a threshold value Y at the time t (N in S180), the processes subsequent to step S150 are performed again. Conversely, when the absolute value of the second acceleration data is equal to or less than the threshold value Y at the time t (Y in S180), the processing unit 200 performs the calculation process using the first acceleration data (S120) and performs the processes subsequent to step S130 again.

In the flowchart, the threshold value X and the threshold value Y are set to be values lower than the maximum acceleration which can be measured by the first acceleration sensor 100. The threshold value Y may be the same as the threshold value X. However, when the first acceleration data and the second acceleration data vibrate near the threshold value X or the threshold value Y, the acceleration data used for the calculation process is changed several times. Therefore, there is a concern of the accuracy of the calculation process deteriorating. For this reason, hysteresis is preferably given in the transformation determination of the acceleration data as "the threshold value X>the threshold value Y."

In the flowchart of FIG. 6, the first acceleration data is used in the comparison of the threshold values in steps S110 and S180. However, when there is little difference between the first acceleration data and the second acceleration data within the measurement range of the first acceleration sensor 100, the second acceleration data may be used.

For example, when there are two of the detection axes in the second acceleration sensor 102 (the x and y axes), the second acceleration data may be used as x-axis acceleration data and y-axis acceleration data and data of the z axis included in the first acceleration data may be used as z-axis acceleration data in step S150.

Impact Detection Process

Figure 7:
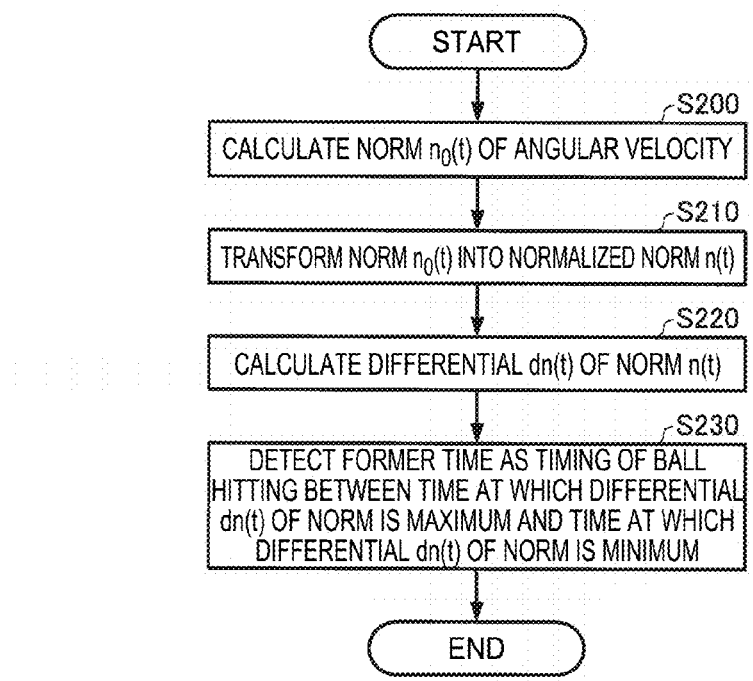
FIG. 7 is a flowchart illustrating an example of an order of a process of detecting a timing at which the subject hits a ball.

FIG. 7 is a flowchart illustrating an example of an order of the process (the process of step S30 in FIG. 5) of detecting the timing at which the subject 2 hits the ball.

As illustrated in FIG. 7, the processing unit 200 first calculates a value of a norm $n_0(t)$ of angular velocity of each axis at each time t using the acquired angular velocity data (angular velocity data selected at each time t) (S200). For example, when the angular velocity data at the time t is x(t), y(t), and z (t), a norm $n_0(t)$ of angular velocity is calculated using Expression (1) below.

$$n_0(t) = \sqrt{x(t)^2 + y(t)^2 + z(t)^2} \qquad (1)$$

Figure 8:
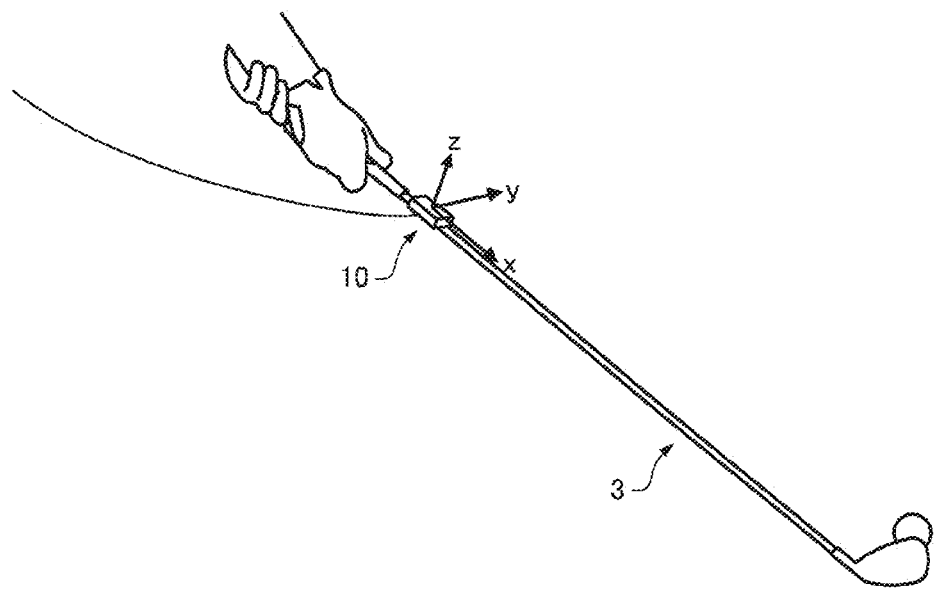
FIG. 8 is a diagram illustrating examples of positions and directions in which a sensor unit is mounted.
Figure 9A:
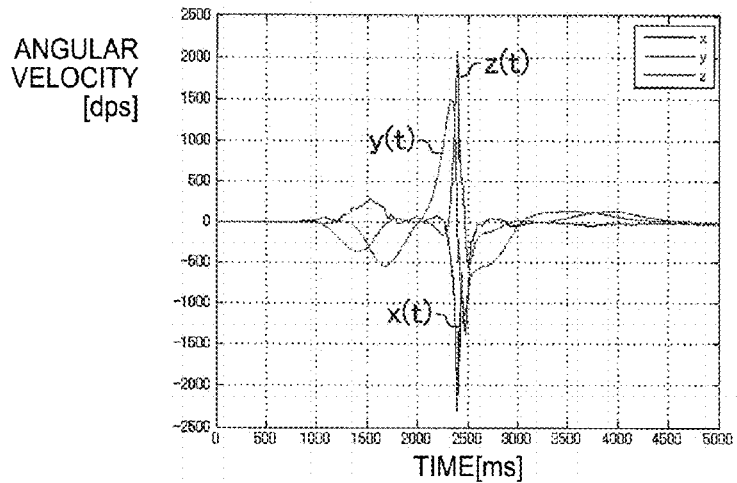
FIG. 9A is a diagram illustrating a graph of triaxial acceleration at the time of swinging.

As illustrated in FIG. 8, the sensor unit 10 is mounted near the grip of the shaft of the golf club 3 so that the x axis is in a direction parallel to the major axis of the shaft, the y axis is in a swing direction, and the z axis is a direction perpendicular to a swing plane. Examples of triaxial angular data x(t), y(t), and z(t) when the subject 2 performs a swing to hit the golf ball 4 are illustrated in FIG. 9A. In FIG. 9A, the horizontal axis represents a time (msec) and the vertical axis represents angular velocity (dps).

Next, the processing unit 200 transforms the norm $n_0(t)$ of the angular velocity at each time t into a norm n(t) subjected to normalization (scale transformation) within a predetermined range (S210). For example, when max ($n_0$) is the maximum value of the norm of the angular velocity during an acquisition period of the measurement data, the norm $n_0(t)$ of the angular velocity is transformed into the norm n(t) normalized in the range of 0 to 100 according to Expression (2) below.

$$n(t) = \frac{100 \times n_0(t)}{\max(n_0)} \qquad (2)$$

Figure 9B:
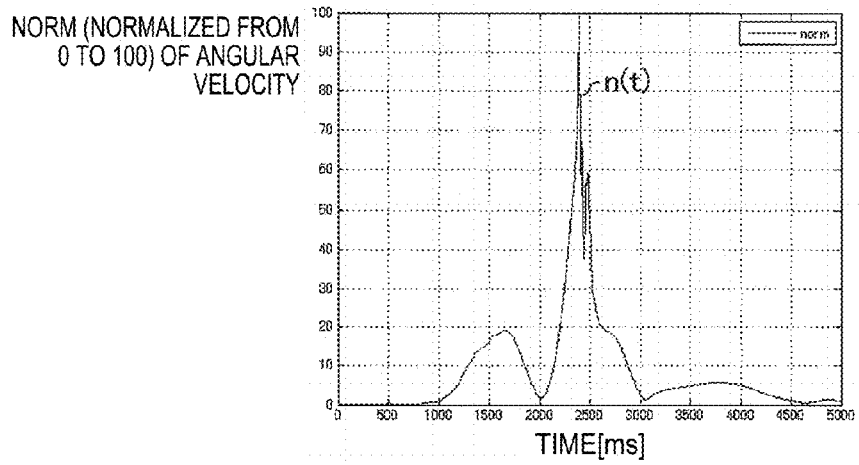
FIG. 9B is a diagram illustrating a graph of calculation values of a norm of the triaxial acceleration.

FIG. 9B is a diagram illustrating a graph of the norm n(t) normalized in the range of 0 to 100 according to Expression (2) after the norm $n_0(t)$ of the triaxial angular velocity is calculated from the triaxial angular velocity data x(t), y(t), and z(t) in FIG. 9A according to Expression (1). In FIG. 9B, the horizontal axis represents a time (msec) and the vertical axis represents a norm of the angular velocity.

Next, the processing unit 200 calculates a differential dn(t) of the norm n(t) after the normalization at each time t (S220). For example, when Δt is a measurement period of the triaxial angular velocity data, the differential (difference) dn(t) of the norm of the angular velocity at the time t is calculated according to Expression (3) below.

$$dn(t)=n(t)-n(t-\Delta t) \qquad (3)$$

Figure 9C:
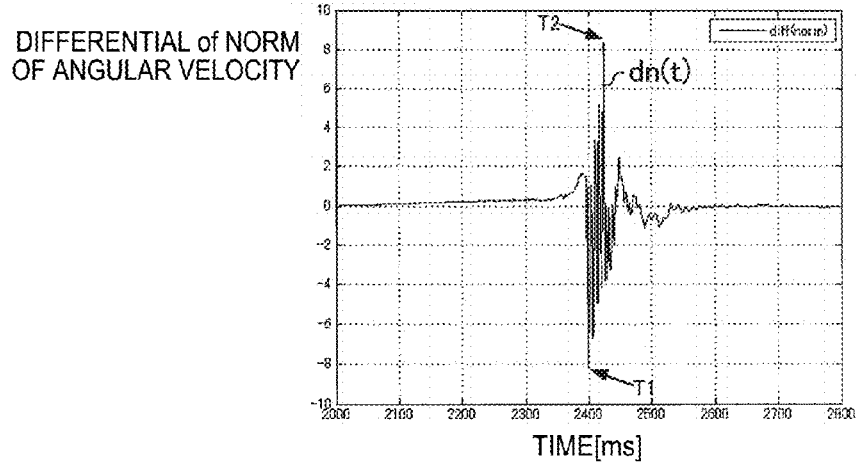
FIG. 9C is a diagram illustrating a graph of differential calculation values of the norm of the triaxial acceleration.

FIG. 9C is a diagram illustrating a graph of the differential dn(t) calculated from the norm n(t) of the triaxial angular velocity in FIG. 9B according to Expression (3). In FIG. 9C, the horizontal axis represents a time (msec) and the vertical axis represents differential values of the norm of the triaxial angular velocity. In FIGS. 9A and 9B, the horizontal axis is shown from 0 to 5 seconds. In FIG. 9C, however, the horizontal axis is shown at 2 to 2.8 seconds so that a change in the differential value before and after the ball hitting can be known.

Finally, the processing unit 200 detects the former time between a time at which the value of the differential dn(t) of the norm is maximum and a time at which the value of the differential dn(t) of the norm is minimum as the timing of the ball hitting (S230). In a normal golf swing, swing speed is considered to be maximum at the moment at which the ball is hit. Since the value of the norm at the angular velocity is also changed according to the swing velocity, a timing at which the differential value of the norm of the angular velocity is maximum or minimum during the series of swing actions (that is, a timing at which the differential value of the norm of the angular velocity is the positive maximum value or the negative minimum value) can be comprehended as the timing of the ball hitting (impact). Since the golf club 3 vibrates because of the ball hitting, the timing at which the differential value of the norm of the angular velocity is maximum and the timing at which the differential value of the norm of the angular velocity is minimum are considered to be paired. Of the timings, the former timing is considered to be the moment of the ball hitting. Accordingly, for example, of T1 and T2, T1 is detected as the timing of the ball hitting in the graph of FIG. 9C.

When the subject 2 performs a swing action, a series of rhythms in which the subject 2 stops the golf club at the top position, performs a downswing, hits the ball, and performs follow-through is assumed. Accordingly, according to the flowchart of FIG. 7, the processing unit 200 may detect candidates of the timing at which the subject 2 hits the ball and determine whether the measurement data before and after the detected timing matches the rhythm. When the measurement data before and after the detected timing matches the rhythm, the detected timing is confirmed as the timing at which the subject 2 hits the ball. When the measurement data before and after the detected timing does not match the rhythm, a subsequent candidate may be detected.

In the flowchart of FIG. 7, the processing unit 200 detects the timing of the ball hitting using the triaxial angular velocity data. However, the same timing of the ball hitting can also be detected using the triaxial acceleration data.

Process of Calculating Posture of Sensor Unit

Figure 10:
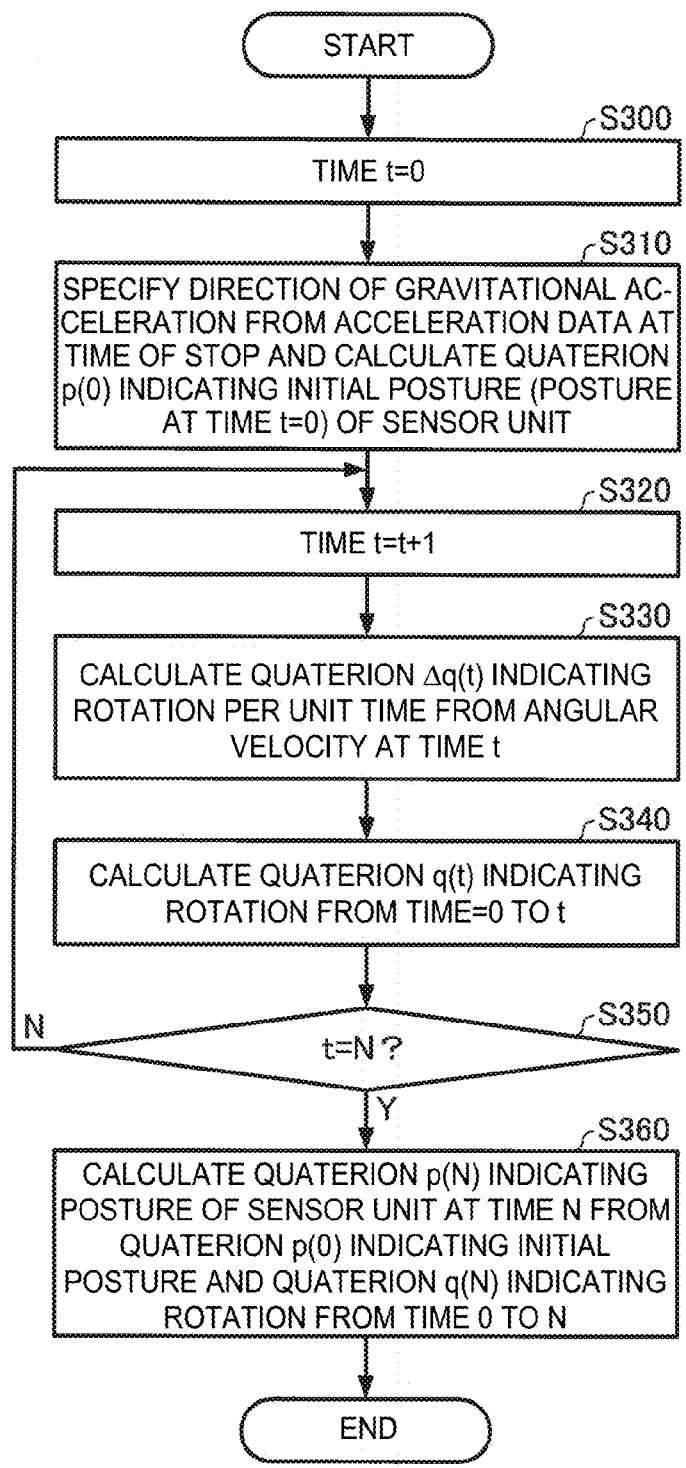
FIG. 10 is a flowchart illustrating an example of an order of a process of calculating the posture of the sensor unit.

FIG. 10 is a flowchart illustrating an example of an order of a process (a process in part of step S40 in FIG. 5) of calculating the posture (posture at time N) of the sensor unit 10.

As illustrated in FIG. 10, at the time of stop at a time t=0 (S300), the processing unit 200 first specifies the direction of the gravitational acceleration from the triaxial acceleration data and calculates a quaterion p(0) indicating the initial posture (posture at the time t=0) of the sensor unit 10 (S310).

For example, when the initial posture is assumed to be a vector $(X_0, Y_0, Z_0)$ of the XYZ coordinate system, the quaterion p(0) is expressed by Expression (4) below.

$$p(0)=(0,X_0,Y_0,Z_0) \qquad (4)$$

The quaterion q indicating rotation is expressed by Expression (5) below.

$$q=(w,x,y,z) \qquad (5)$$

In Expression (5), when θ is a rotational angle of target rotation and $(r_x, r_y, r_z)$ is a unit vector of a rotation axis, w, x, y, and z are expressed by Expression (6) below.

$$w = \cos\frac{\theta}{2},$$
$$x = r_x \cdot \sin\frac{\theta}{2},$$
$$y = r_y \cdot \sin\frac{\theta}{2},$$
$$z = r_z \cdot \sin\frac{\theta}{2} \qquad (6)$$

Since the sensor unit 10 stops at the time t=0, the quaterion q(0) indicating the rotation at the time t=0 as θ=0 is obtained as in Expression (7) below from Expression (5) for which θ=0 is substituted in to Expression (6).

$$q(0)=(1,0,0,0) \qquad (7)$$

Next, the processing unit 200 updates the time t to t+1 (S320) and calculates a quaterion Δq(t) indicating rotation per unit time of the time t from the triaxial angular velocity data at the time t (S320).

For example, when $\omega(t)=(\omega_x(t), \omega_y(t), \omega_z(t))$ is the triaxial angular velocity data at the time t, the magnitude |ω(t)| of the angular velocity per sample measured at the time t is calculated according to Expression (8) below.

$$|\omega(t)|=\sqrt{\omega_x(t)^2+\omega_y(t)^2+\omega_z(t)^2} \qquad (8)$$

Since the magnitude |ω(t)| of the angular velocity is a rotational angle per unit time, a quaterion Δq(t+1) indicating rotation per unit time of the time t is calculated according to Expression (9) below.

$$\Delta q(t) = \left(\cos\frac{|\omega(t)|}{2}, \frac{\omega_x(t)}{|\omega(t)|}\sin\frac{|\omega(t)|}{2}, \frac{\omega_y(t)}{|\omega(t)|}\sin\frac{|\omega(t)|}{2}, \frac{\omega_z(t)}{|\omega(t)|}\sin\frac{|\omega(t)|}{2}\right) \qquad (9)$$

Here, since t=1, the processing unit 200 calculates Δq(1) according to Expression (9) from triaxial angular velocity data $\omega(1)=(\omega_x(1), \omega_y(1), \omega_z(1))$ at a time t=1.

Next, the processing unit 200 calculates quaterion q(t) indicating rotation from the time 0 to the time t (S340). The quaterion q(t) is calculated according to Expression (10) below.

$$q(t)=q(t-1)\cdot \Delta q(t) \qquad (10)$$

Here, since t=1, the processing unit 200 calculates q(1) according to Expression (10) from q(0) of Expression (7) and Δq(1) calculated in step S330.

Next, the processing unit 200 repeats the processes of steps S320 to S340 until t=N. Then, when t=N (Y of S350), the processing unit 200 calculates a quaterion p(N) indicating a posture at the time N (S360) from a quaterion p(0) indicating the initial posture calculated in step S310 and a quaterion q(N) indicating rotation from a time t=0 to N calculated in the immediately previous step S340 according to Expression (11) below, and then the process ends.

$$p(N)=q(N)\cdot p(0)\cdot q^*(N) \qquad (11)$$

In Expression (11), q*(N) indicates a conjugated quaterion of q(N). This p(N) is expressed as in Expression (12) below. When the posture of the sensor unit 10 at the time N is expressed as a vector of the XYZ coordinate system, the vector is $(X_N, Y_N, Z_N)$.

$$p(N)=(0, X_N, Y_N, Z_N) \qquad (12)$$

Specification of Sensor Unit

In order for the motion analysis device 20 according to the above-described embodiment to analyze a golf swing with high accuracy, the sensor unit 10 necessarily has a specification appropriate for the swing analysis.

First, the sensor unit 10 is mounted on the golf club 3 or the subject 2, an influence on a swing of the subject 2 is necessarily small even the sensor unit 10 is mounted. That is, a large difference does not have to occur in a swing action between when the subject 2 performs a swing using the golf club 3 on which the sensor unit 10 is mounted and when the subject 2 performs a swing using the general golf club 3 on which the sensor unit 10 is not mounted.

For example, when the weight of the sensor unit 10 is large to the extent that the weight may not be ignored with respect to the weight of the golf club 3, the center of gravity is considerably changed due to a position at which the sensor unit 10 is mounted, and thus the swing action of the subject 2 is affected. For example, when the size of the sensor unit 10 is large, a field of view of the subject 2 seeing the golf ball 4 may be hindered depending on the position at which the sensor unit 10 is mounted or concentration of the subject 2 may be lowered although the size of the sensor unit 10 may not hinder the field of view. In this way, the subject 2 may have a state of mind different from that of a normal swing, and thus the swing action may be affected. Accordingly, the weight or size of the sensor unit 10 is preferably as small as possible.

Figure 11A:
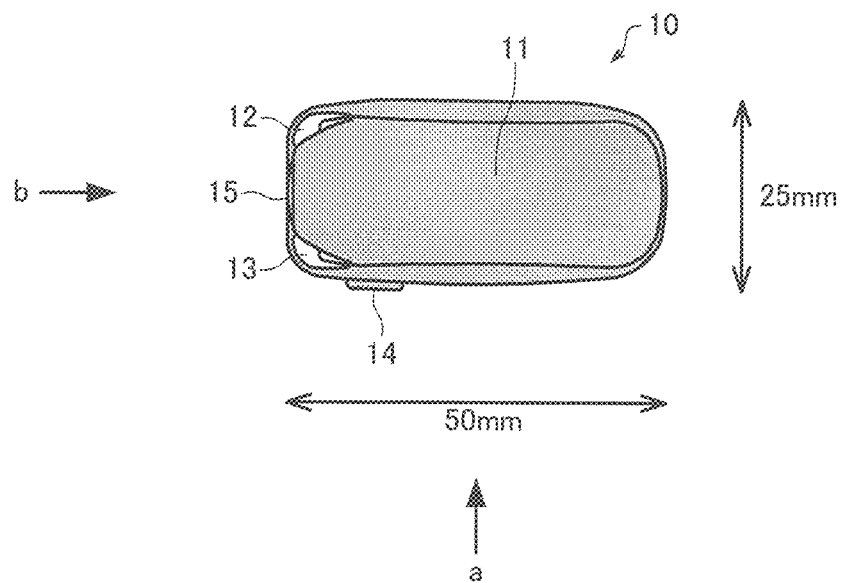
FIG. 11A is a plan view illustrating the sensor unit.
Figure 11B:
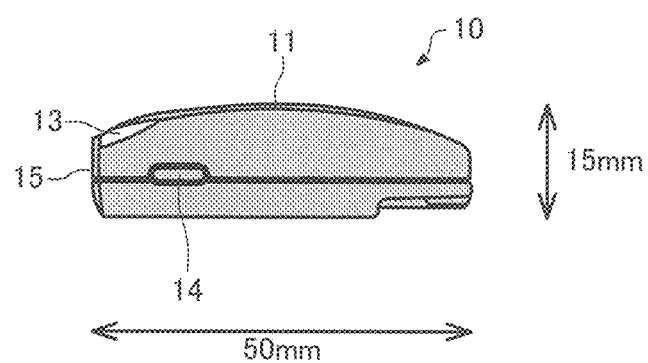
FIG. 11B is a side view illustrating the sensor unit.
Figure 11C:
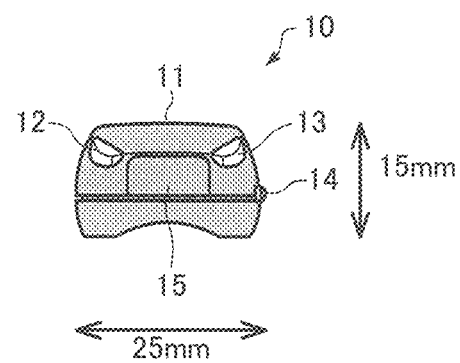
FIG. 11C is a front view illustrating the sensor unit.
Figure 12A:
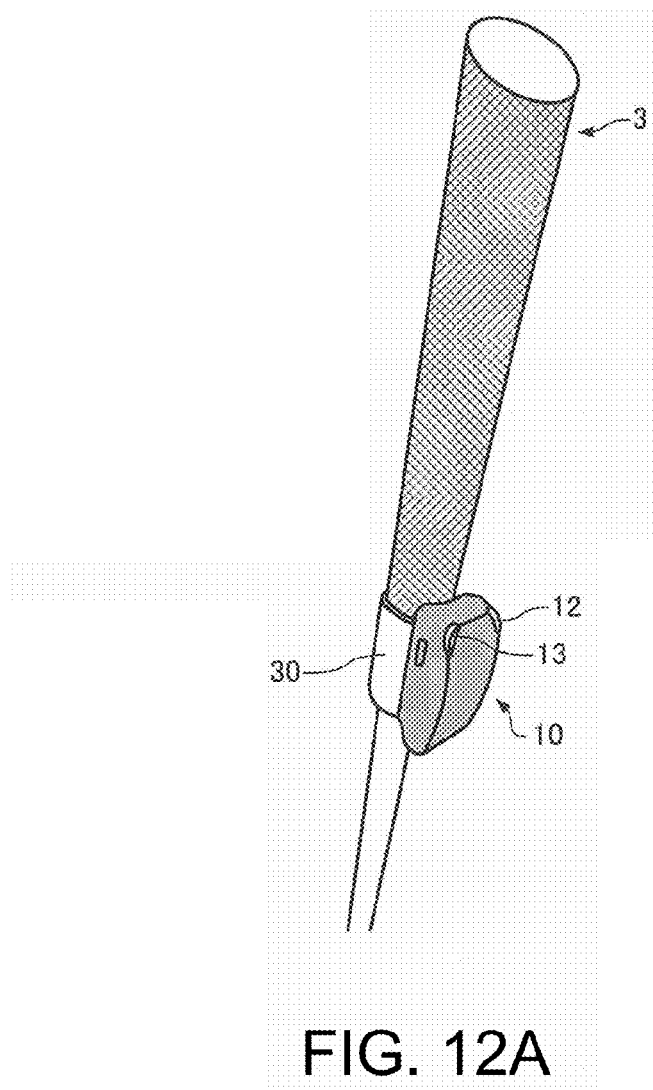
FIGS. 12A and 12B are a perspective view and a plan view illustrating an example of a state in which the sensor unit is mounted on a golf club.
Figure 12B:
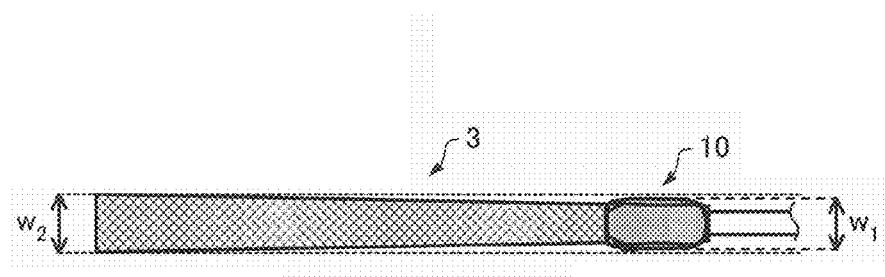

When the present specification is applied, the applicants have succeeded in developing the sensor unit 10 with a small size or light weight. The outer appearance of the developed sensor unit 10 is schematically illustrated in FIGS. 11A to 11C. FIG. 11A is a plan view of the sensor unit 10. FIG. 11B is a side view of the sensor unit 10 when viewed in a direction (lower side of FIG. 11A) indicated by an arrow a of FIG. 11A. FIG. 11C is a front view of the sensor unit 10 when viewed in a direction (left side of FIG. 11A) indicated by an arrow b of FIG. 11A. FIGS. 12A and 12B illustrate an example in which the sensor unit 10 is mounted on the golf club 3. FIG. 12A is a perspective view and FIG. 12B is a plan view when viewed from the side of the sensor unit 10.

As illustrated in FIGS. 11A to 11C, the developed sensor unit 10 has the size with a width of 25 mm, a length of 50 mm, and a height of 15 mm. As illustrated in FIG. 12A, even when the sensor unit 10 is fixed to the golf club 3 with an attachment 30, the sensor unit 10 does not hinder the field of view of the subject 2 and is small in size to the extent that the state of mind of the subject 2 is almost not affected. In particular, as illustrated in FIG. 12B, a width $w_1$ (=25 mm) of the sensor unit 10 is less than a maximum width (the width of the front end of the grip portion in FIG. 10B) $w_2$ of the shaft of the general golf club 3.

As illustrated in FIGS. 11A to 11C, on the surface of a body 11 of the developed sensor unit 10, two LEDs 12 and 13 (which are examples of light-emitting units) are installed at positions of distant ends portions, and a power switch 14 and a detachable cover 15 covering a charging connector of an internal battery are installed. The LED 12 is used to give various instructions to the subject 2. For example, the color of the LED 12 is changed to indicate that swing measurement is possible (start of a swing is instructed) when the subject 2 stops (at the time of address). The LED 13 is used to display an ON/OFF state of the power in conjunction with an operation of pressing the power switch 14.

As illustrated in FIG. 12A, the LED 12 is installed at an end portion of the surface of the body 11 so that the subject 2 easily sees the LED 12 when the sensor unit 10 is mounted on the golf club 3, and thus the subject 2 can see the LED 12 at the time of the address and know a timing at which the subject 2 starts a swing.

Figure 13A:
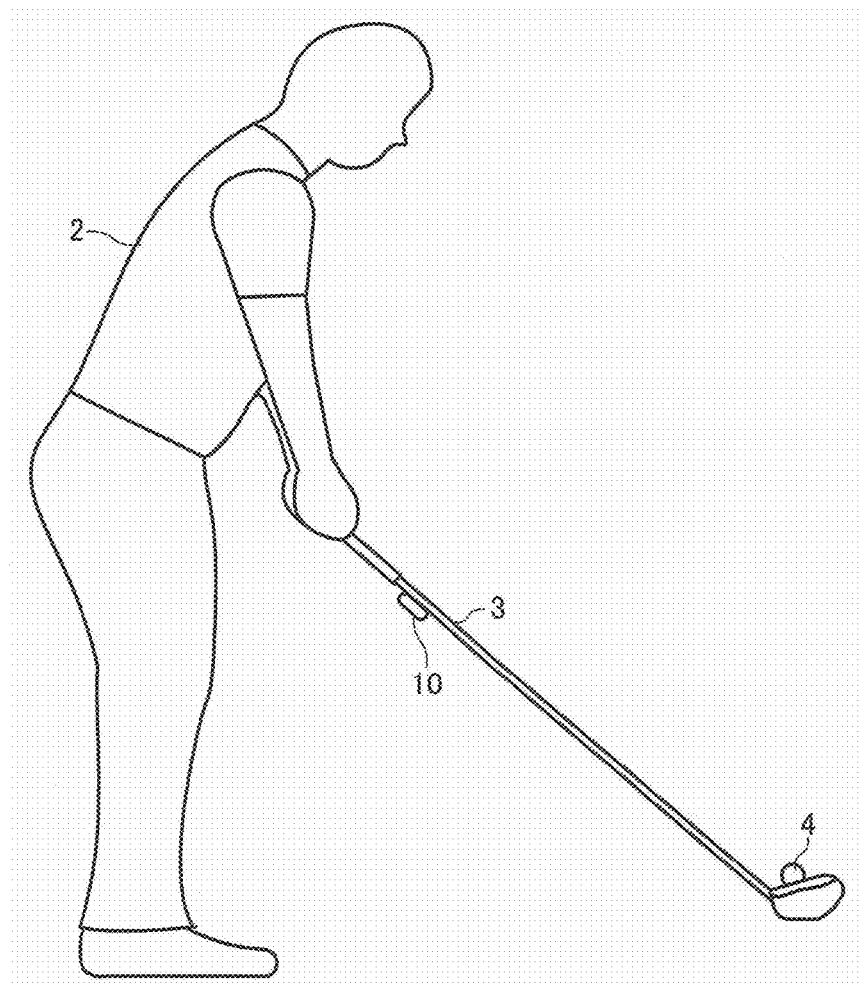
FIGS. 13A and 13B are diagrams for describing another example in which the sensor unit is mounted on a golf club.
Figure 13B:
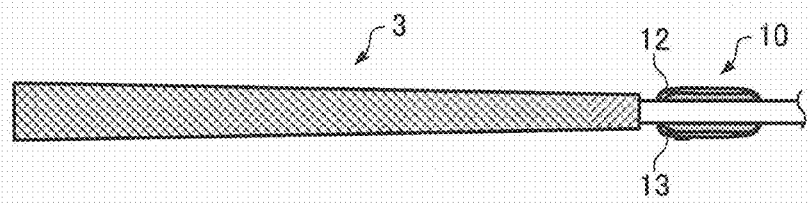

As illustrated in FIG. 13A, the developed sensor unit 10 can be mounted at any position other than the grip portion of the shaft of the golf club 3. The sensor unit 10 can also be mounted on the rear side of the shaft so that most of the sensor unit 10 is hidden when viewed from the subject 2, and thus the influence on the state of mind of the subject 2 can be further lowered. FIG. 13B is a plan view when the sensor unit 10 is viewed from the side of the golf club 3 when the sensor unit 10 is mounted on the rear side of the shaft of the golf club 3. At least parts of the LEDs 12 and 13 are viewed in such a plan view. Accordingly, even when the sensor unit 10 is mounted on the rear side of the shaft, the subject 2 can see a display change of the LED 12 and know a start timing of a swing.

The weight of the developed sensor unit 10 is merely 17 g even including the attachment 30 and the weight of the general golf club 3 is merely in the range of 300 g to 500 g. Therefore, even when the position at which the sensor unit 10 is mounted is changed, the center of gravity is almost unchanged and the swing is barely affected.

Next, in order to perform the swing analysis with high accuracy, the performance of the first acceleration sensor 100, the second acceleration sensor 102, and the angular velocity sensor 110 included in the sensor unit 10 is also important. That is, the second acceleration sensor 102 and the angular velocity sensor 110 have to comprehend the maximum acceleration and the maximum angular velocity, respectively, during a swing.

For the angular velocity during the swing, the angular velocity near the rotation axis of the swing is large and is the maximum before and after the time of the ball hitting (at the time of an impact) similarly. Accordingly, the angular velocity sensor 110 necessarily comprehends the maximum angular velocity before and after the impact, and thus is preferably set to a measurement range which is as high as possible as a range in which a measurement resolution necessary to calculate the posture can be ensured.

For the acceleration during the swing, the translation acceleration applied in the direction of the swing and the centrifugal acceleration by the rotation of the swing are large and the acceleration is the maximum before and after the time of the ball hitting (at the time of the impact) at which the speed is the maximum. In particular, since a shock is also applied at the time of the ball hitting, the translation acceleration becomes considerably large. Accordingly, when the sensor unit 10 is mounted on the golf club 3 so that the three axes are oriented in the directions illustrated in FIG. 8, it is necessary to set the second acceleration sensor 102 in the measurement range in which the acceleration at the time of the impact is high enough to be measured at the two axes, which are the x axis at which the centrifugal acceleration is detected and the y axis at which the translation acceleration is detected. It is not necessary for the first acceleration sensor 100 to measure the acceleration at the time of the impact. However, since it is necessary to measure the acceleration applied during a period other than the periods before and after the impact, the measurement range which is as high as possible is preferably set as the range in which the necessary measurement resolution is ensured.

Figures 14, 15:
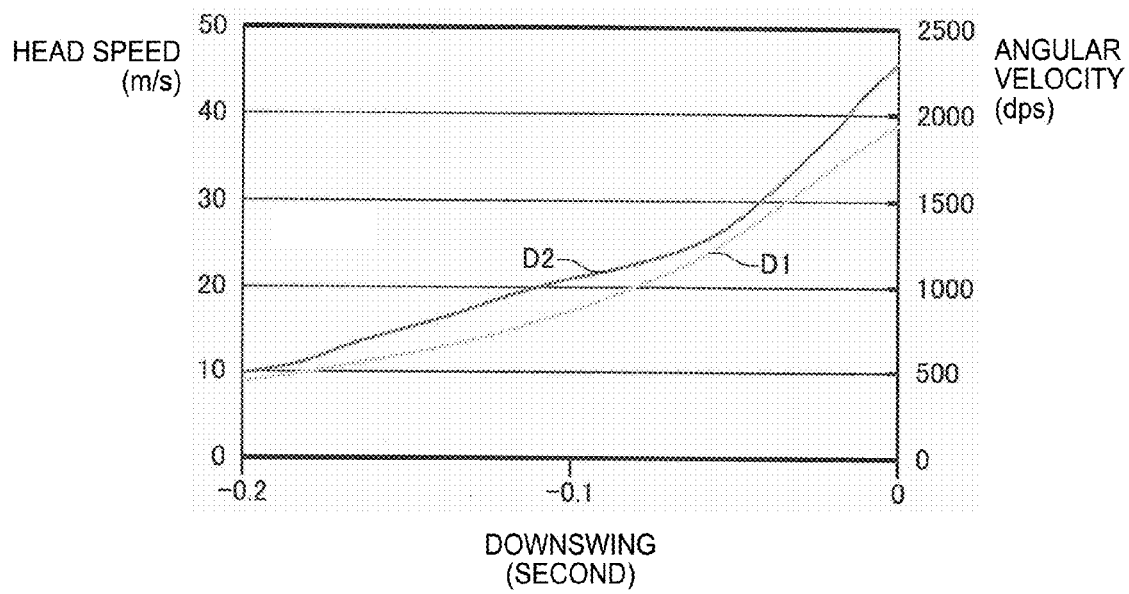
FIG. 14 is a diagram illustrating actually measured data of an angular velocity applied during a swing.
FIG. 15 is a diagram summarizing the specification of the sensor unit.

When the sensor unit 10 was developed, the head speeds of general golfers was known to be in the range of 30 m/s to 45 m/s and the head speeds of professional golfers was known to exceed 50 m/s in some cases as the result of being analyzed from various viewpoints such as actual measurement or hearing, and thus the actually measured data illustrated in FIG. 14 can also be obtained. In FIG. 14, the horizontal axis represents a time (second) after a downswing and the vertical axis represent a head speed (m/s) or an angular velocity (degrees per seconds (dps)) of rotation of a rotation axis of the swing. The head speed and the angular velocity of the rotation of the rotational axis of the swing have a proportional relation. D1 indicates measurement data of amateur golfers and D2 indicates measurement data of professional golfers. A time 0 is an impact moment, the angular velocity of about 2000 dps is measured in amateur golfers, and the angular velocity of 2000 dps to 2500 dps is measured in professional golfers. Accordingly, in the embodiment, the angular velocity sensor 110 is assumed to be able to measure the angular velocity of at least 2500 dps. In order to perform the motion analysis of a golfer performing a faster swing with high accuracy, the angular velocity sensor 110 is preferably assumed to be able to measure angular velocity of at least 3000 dps.

When the sensor unit 10 is mounted on the shaft or the arm at a position of 50 cm to 70 cm from the rotation center (position of shoulder) of the swing, maximum acceleration of the 50 G to 70 G is known to be applied in the vicinity of the impact and maximum acceleration of the 16 G to 24 G is known to be applied in a portion other than the vicinity of the impact in general players. Accordingly, in the embodiment, the second acceleration sensor 102 is assumed to be able to measure acceleration of at least 50 G in order to comprehend acceleration at the time of an impact and the first acceleration sensor 100 is assumed to be able to measure acceleration of at least 16 G in order to comprehend acceleration at a time other than just before or after the impact. The first acceleration sensor 100 is preferably assumed to be able to measure acceleration of at least 24 G when a necessary measurement resolution can be ensured.

In the actually developed sensor unit 10, a triaxial gyro sensor capable of measuring at least 3000 dps (the measurement range is equal to or greater than ±3000 dps) was adopted as the angular velocity sensor 110. Further, a triaxial acceleration sensor capable of measuring at least 16 G (the measurement range is equal to or greater than ±16 G) was adopted as the first acceleration sensor 100 and a biaxial acceleration sensor 102 capable of measuring at least 200 G (the measurement range is equal to or greater than ±200 G) was adopted as the second acceleration sensor 102.

In order to improve measurement accuracy, a sampling rate of at least some sensors (preferably all) among the first acceleration sensor 100, the second acceleration sensor 102, and the angular velocity sensor 110 is preferably equal to or greater than 1 kilo samples per second (ksps). However, as the sampling rate is higher, power consumption increases and the battery life of an internal battery is shortened. In the developed sensor unit 10, a sampling rate (output data rate) of 1 ksps and a battery life of 4 hours were realized.

In FIG. 15, the specification of the developed sensor unit 10 is summarized. Thus, since the developed sensor unit 10 is small in size and lightweight, the sensor unit 10 is suitable for the motion analysis. Further, since the measurement range is sufficient, the motion analysis can be realized with high accuracy. The developed sensor unit 10 can also be applied to motion analysis of tennis, baseball, or the like in which a swing is generally slower than that of golf.

In the motion analysis system 1 according to the embodiment, as described above, the angular velocity sensor 110 capable of measuring angular velocity of at least 2500 dps in the sensor unit 10 can comprehend the maximum angular velocity applied during a swing of the general subject 2. In the sensor unit 10, the second acceleration sensor 102 capable of measuring acceleration of at least 50 G can comprehend the maximum acceleration applied during the swing of the general subject 2. In the sensor unit 10, the first acceleration sensor 100 can measure acceleration with higher resolution than the second acceleration sensor 102. The motion analysis device 20 can detect a timing at which the subject 2 hits the ball using the acceleration data measured by the second acceleration sensor 102 and can calculate the position or the posture of the sensor unit 10 with high accuracy using the acceleration data measured by the first acceleration sensor 100 or the angular velocity data measured by the angular velocity sensor 110. Accordingly, in the motion analysis system 1 according to the embodiment, a golf swing of the subject 2 can be analyzed with high accuracy.

2. Modification Examples

The invention is not limited to the embodiment, but can be modified in various forms within the scope of the gist of the invention.

For example, in the above-described embodiment, the motion analysis system (motion analysis device) analyzing a golf swing has been exemplified. However, the invention can be applied to an motion analysis system (motion analysis device) using various kinds of motion equipment such as a tennis racket or a baseball bat.

In the above-described embodiment, the motion analysis device 20 performs the motion analysis using the measurement data of one sensor unit 10. However, each of the plurality of sensor units 10 may be mounted on the golf club 3 or the subject 2 and the motion analysis device 20 may perform the motion analysis using measurement data of the plurality of sensor units 10.

In the above-described embodiment, the sensor unit 10 and the motion analysis device 20 are separate, but may be integrated as a sensor unit or an motion analysis device that can be mounted on motion equipment or a subject.

The above-described embodiment and each modification example are merely examples, but the invention is not limited thereto. For example, each embodiment and each modification example can also be combined appropriately.

The invention includes a configuration (for example, a configuration in which functions, methods, and results are the same or a configuration in which purposes and advantages are the same) which is substantially the same as the configuration described in the embodiment. The invention includes a configuration in which a portion which is not essential in the configuration described in the embodiment is substituted. The invention includes a configuration in which the same operational effects as those of the configuration described in the embodiment are obtained or a configuration in which the same purposes can be achieved. The invention includes a configuration in which a technology of the related art is added to the configuration described in the embodiment.

The entire disclosure of Japanese Patent Application No. 2014-031825, filed Feb. 21, 2014 is expressly incorporated by reference herein.

What is claimed is:

1. An motion analysis device comprising:
a first sensor that is able to measure angular velocity of at least 2500 dps;
a second sensor that is able to measure acceleration of at least 50 G;
a third sensor that is able to measure acceleration of at least 24 G, the third sensor having a lower measurement range than the second sensor; and
a processing unit that performs motion analysis for a subject using an output of a sensor unit comprising the first sensor, the second sensor and the third sensor and mounted on at least one of a golf dub and the subject operating the golf club,
wherein the processing unit calculates a posture of the sensor unit at a time of motion using the angular velocity measured by the first sensor, and performs selection of outputs of the second and third sensors according to acceleration applied at the time of the motion and calculates a position of the sensor unit during the motion using the selected acceleration of the sensor, the output of the third sensor being selected at a first threshold during the operation of the golf club and the output of the second sensor being selected at a second threshold during the operation of the golf club different from the first threshold, so as to allow for the position of the sensor unit to be determined.

2. The motion analysis device according to claim 1,
wherein the first sensor is able to measure angular velocity of rotation of a plurality of axes, and
wherein the processing unit calculates a timing of ball hitting from a norm of the angular velocity generated at the rotation of each axis.

3. The motion analysis device according to claim 1, wherein the processing unit performs calculation using the acceleration measured by the third sensor at a time of start of the motion and performs calculation using the acceleration measured by the second sensor when acceleration applied during the motion exceeds a threshold value set in advance.

4. The motion analysis device according to claim 1, wherein the first sensor is able to measure angular velocity of at least 3000 dps.

5. The motion analysis device according to claim 1, wherein a sampling rate of at least one of the first, second, and third sensors is equal to or greater than 1 ksps.

6. The motion analysis device according to claim 1, wherein a width of the sensor unit is equal to or less than a maximum width of a shaft of the golf club.

* * * * *